United States Patent
Kim et al.

(10) Patent No.: US 8,035,925 B2
(45) Date of Patent: Oct. 11, 2011

(54) ACTUATOR LATCH SYSTEM OF HARD DISK DRIVE INCLUDING LATCH LEVER THAT ABSORBS SHOCK

(75) Inventors: Do-wan Kim, Hwaseong-si (KR); Ki-tag Jeong, Hwaseong-si (KR); Woo-cheol Jeong, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 895 days.

(21) Appl. No.: 12/021,345

(22) Filed: Jan. 29, 2008

(65) Prior Publication Data
US 2008/0180852 A1 Jul. 31, 2008

(30) Foreign Application Priority Data
Jan. 30, 2007 (KR) .................. 10-2007-0009493

(51) Int. Cl.
*G11B 5/54* (2006.01)
(52) U.S. Cl. ...................................... 360/256
(58) Field of Classification Search .................. 360/256, 360/256.4, 256.6
See application file for complete search history.

(56) References Cited

U.S. PATENT DOCUMENTS

| | | | | |
|---|---|---|---|---|
| 6,731,468 B2 * | 5/2004 | Williams et al. | .............. | 360/256 |
| 2004/0257709 A1 | 12/2004 | Lee et al. | | |
| 2005/0152069 A1 | 7/2005 | Jeong | | |
| 2005/0275973 A1 | 12/2005 | Kim | | |
| 2006/0039086 A1 | 2/2006 | Byun et al. | | |
| 2006/0114613 A1 | 6/2006 | Hong et al. | | |

FOREIGN PATENT DOCUMENTS

| | | |
|---|---|---|
| EP | 1 308 934 A2 | 5/2003 |
| EP | 1 517 303 A1 | 3/2005 |
| EP | 1 564 726 A1 | 8/2005 |
| JP | 2001-357638 | 12/2001 |
| JP | 2002-063772 | 2/2002 |
| JP | 2003-208772 | 7/2003 |
| KR | 1020020079569 A | 10/2002 |
| KR | 1020050073853 | 7/2005 |

\* cited by examiner

*Primary Examiner* — A. J. Heinz
(74) *Attorney, Agent, or Firm* — Volentine & Whitt, PLLC

(57) ABSTRACT

An actuator latch system of an HDD retains a swing arm in place when the magnetic head of the HDD is parked and includes a rotatable latch lever having a hook that absorbs shock when engaging the swing arm. A rear end of the swing arm has a corner portion. The hook has first and second portions with a third portion extending there between Inner surfaces of the first through third portions delimit a slot. The inlet of the slot has a width less than the corner portion. The inner surface of the first portion of the hook contacts a first surface of the rear end of the swing arm, and the inner surface of the second portion of the hook contacts a second surface of the rear end of the swing arm, when a shock rotates the swing arm while the magnetic head is parked.

8 Claims, 7 Drawing Sheets

ACTUATOR LATCH SYSTEM OF HARD DISK DRIVE INCLUDING LATCH LEVER THAT ABSORBS SHOCK

BACKGROUND OF THE INVENTION

1. Field of the Invention

The present invention relates to a hard disk drive. More particularly, the present invention relates to an actuator latch system of a hard disk drive, which locks an actuator of the hard disk drive in place when the disk of the hard disk drive is not rotating.

2. Description of the Related Art

Hard disk drives (HDD) are used in electronic devices such as computers to reproduce data from a disk or record data onto the disk. More specifically, in addition to such a disk, an HDD includes a magnetic (read/write) head, an actuator for moving the magnetic head over a desired location (track) of the disk, and a spindle motor for rotating the disk. The magnetic head is floated a predetermined height from the recording surface of the disk while the disk is rotated, and detects/modifies the magnetization of the recording surface of the disk to reproduce/record data from/onto the disk.

In addition, when the HDD is not in use, that is, when the disk is not rotating, the magnetic head is parked off of the recording surface of the disk. Systems for parking the magnetic head of the HDD include a contact start stop (CSS) type of parking system and a ramp type of parking system. In the CSS type of parking system, an inner circumferential portion of the disk devoid of recorded data is reserved as a parking zone, and the magnetic head is held against the parking zone of the disk when the magnetic head is parked. In the ramp type of parking system, a ramp is disposed radially outwardly of the disk, and the magnetic head is held against the ramp when the magnetic head is parked.

However, an HDD can be subjected to external shock or vibrations when the HDD is not in use. Such external shock or vibrations have the potential to move the magnetic head out of the parking zone or off of the ramp and onto the recording surface of the disk. If this were allowed to happen, the magnetic head or the recording surface of the disk could be damaged. Therefore, the actuator needs to be locked in place when the magnetic head is parked. To this end, HDDs include various kinds of actuator latch systems.

FIGS. 1A, 1B, and 1C illustrate a conventional latch system of an HDD for locking the actuator of the HDD in place when the magnetic head is parked.

Referring to FIG. 1A, the actuator 10 of the HDD includes a swing arm 12 that is rotatably supported by a pivot 11, a suspension 13 disposed on an end portion of the swing arm 12, and a slider 14 supported by the suspension 13. The head slider 14 contains the magnetic head. The suspension biases the head slider 14 and hence, the magnetic head, toward a (recording) surface of the disk during a read/write operation in which the magnetic head is recording data onto the disk or reading data from the disk.

In addition, the HDD includes a single lever inertial latch system 20 for locking the actuator 10 in place when the magnetic head is parked on ramp 15. The inertial latch system 20 includes a latch lever 21 supported so as to be freely rotatable, a latch hook 22 integral with the latch lever 21, a notch 23 in the swing arm 12 of the actuator 10, a crash stop 24 that limits the rotation of the swing arm 12 in a clockwise direction, and a latch stop 25 that limits the rotation of latch lever 21 in the clockwise direction.

As shown in FIG. 1B, when shock applied to the HDD causes the swing arm 12 of the actuator 10 and the latch lever 21 to rotate counter-clockwise due to inertia, the latch hook 22 is received in the notch 23 such that the rotation of the swing arm 12 of the actuator 10 is arrested. On the other hand, as shown in FIG. 1C, when shock applied to the HDD causes the swing arm 12 of the actuator 10 and the latch lever 21 to rotate clockwise due to inertia, the swing arm 12 collides with the crash stop 24, and then rebounds from the crash stop 24 and thus rotates counter-clockwise. At the same time, the latch lever 21 rebounds from the latch stop 25 and thus rotates counter-clockwise. In this case, the latch hook 22 can be received in the notch 23 to arrest the further rotation of the actuator 10 in the counter-clockwise direction. However, the conventional single lever inertial latch system 20 is unreliable.

In the case in which the shock applied to the HDD causes the swing arm 12 to initially rotate counter-clockwise, the rotation of the swing arm 12 is indeed arrested by the latch lever 21 as described above. However, the impulse generated by the engagement between the swing arm 12 and the latch hook 22 causes the latch lever 21 and the swing arm 12 to spring back. Thus, the swing arm 12 rotates clockwise. The swing arm 12 collides with the crash stop 24, rebounds, and then again rotates counter-clockwise. In this case, though, the rotation of the swing arm 12 and the rotation of the latch lever 21 are poorly timed. As a result, the swing arm 12 is not hooked by the latch hook 22. Therefore, the swing arm 12 continues to rotate counter-clockwise such that the magnetic head moves off of the ramp 15 and onto the recording surface of the disk. Accordingly, the magnetic head or the recording surface of the disk can be damaged.

FIGS. 2A, 2B, and 2C show a dual-lever inertial latch system 40 that is designed to obviate the above-described problem of the single lever inertial latch system.

Referring to FIG. 2A, the dual-lever inertial latch system 40 includes first and second latch levers 41 and 42 that are supported so as to be freely rotatable, a latch pin 43 integral with the first latch lever 41, a latch hook 44 integral with the second latch lever 42, a notch 45 in a swing arm 32 of the actuator 30, and a crash stop 46 limiting the rotation of the swing arm 32 in the clockwise direction.

As shown in FIG. 2B, when shock applied to the HDD causes the swing arm 32 of the actuator 30 and the first and second latch levers 41 and 42 to rotate counter-clockwise due to inertia, the latch hook 44 is received in the notch 45 in the swing arm 32. Thus, the swing arm 32 of the actuator 30 cannot rotate further. On the other hand, as shown in FIG. 2C, when shock applied to the HDD causes the swing arm 32 of the actuator 30 and the first latch lever 41 to rotate clockwise due to inertia, the swing arm 32 initially rotates clockwise, then collides with the crash stop 46, rebounds from the crash stop 46, and thus rotates counter-clockwise. In addition, the first latch lever 41 rotates clockwise, and the latch pin 43 engages the second latch lever 42 to make the second latch lever 42 rotate in the counter-clockwise direction. Accordingly, the latch hook 44 of the second latch lever 42 is received in the notch 45 and thus, the rotation of the swing arm 32 in the counter-clockwise direction is arrested.

The conventional dual-lever inertial latch system 40 operates reliably regardless of the direction in which shock is applied to the HDD. However, two latch levers 41 and 42 are required. That is, the structure of the dual lever latch system 40 is complex and bulky. Accordingly, the dual-lever inertial latch system 40 is expensive. Also, it is difficult to incorporate the dual-lever inertial latch system into a small disk drive such as those used in mobile devices.

SUMMARY OF THE INVENTION

An object of the present invention is to provide a reliable actuator latch system in a hard disk drive (HDD).

More specifically, one object of the present invention is to provide an actuator latch system in an HDD, having a latch lever whose latch hook absorbs a shock from the swing arm of the HDD when the hook engages the swing arm to prevent a rebounding of the swing arm from the latch lever.

According to an aspect of the present invention, in a hard disk drive (HDD) having a base, a swing arm supported on the base so as to be rotatable about an axis of rotation, and a magnetic head supported by the swing arm, there is provided an actuator latch system comprising a member constituting an integral part of a rear end of the swing arm, and a latch lever, wherein the member has a corner where first and second surfaces of the member meet at a point of inflection, and the latch lever has a C-shaped hook that engages both of the first and second surfaces. The hook is disposed adjacent the rear end of the swing arm when the swing arm is in a position at which the magnetic head is parked, and the latch lever is mounted to the base so as to be rotatable about an axis of rotation. The hook defines a slot whose inlet faces in a direction toward the point of inflection. The inlet of the slot has a width that is less than a width of the corner as measured between the first and second surfaces. Accordingly, the corner portion at the rear end of the swing arm enters the slot and the hook engages the first and second surfaces when the HDD experiences a shock that cause the swing arm to rotate in one direction while the magnetic head is parked. Thus, the hook absorbs the shock transmitted by the swing arm.

The latch lever has a latch arm extending to one side of the axis of rotation of the latch lever. The hook may have a first portion, a second portion extending from the latch arm, and a third portion extending between and connecting the first and second portions. Inner surfaces of the first, second, and third portions delimit the slot. Accordingly, the inner surface of the first portion of the hook will contact the first surface of the member constituting an integral part of the rear end of the swing arm, and the inner surface of the second portion of the hook will contact the second surface of the member when the HDD experiences a shock that cause the swing arm to rotate in said one direction while the magnetic head is parked.

Also, the inner surface of the first portion of the hook may have an inclined surface that extends obliquely with respect to the direction in which the latch arm of the latch lever extends at one side of the axis of rotation of the latch lever. Preferably, the first surface of the member constituting an integral part of a rear end of the swing arm has a slope that is substantially the same as that of the inner surface of the first portion of the hook when the hook and the corner at the rear end of the swing arm are engaged.

The second portion of the hook may have a protrusion that contacts the second surface of the member constituting an integral part of a rear end of the swing arm when the hook is engaged with the first and second surfaces of said member. Preferably, the protrusion is triangular.

BRIEF DESCRIPTION OF THE DRAWINGS

The above and other objects features and advantages of the present invention will become more apparent from the following detailed description of the preferred embodiments thereof made with reference to the attached drawings in which.

DETAILED DESCRIPTION OF THE PREFERRED EMBODIMENTS

A hard disk drive (HDD) having an actuator latch system according to the present invention will be described in detail hereinafter with reference to FIGS. 3-9.

Figure 1A:
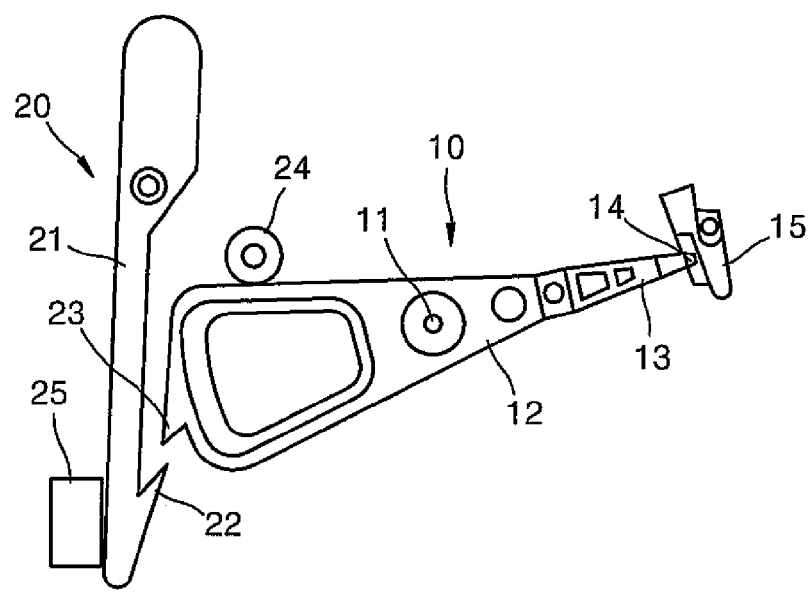
FIGS. 1A, 1B, and 1C are each a plan of a conventional single lever inertial latch system of a hard disk drive (HDD), and together illustrate the operation of the latch system.
Figure 1B:
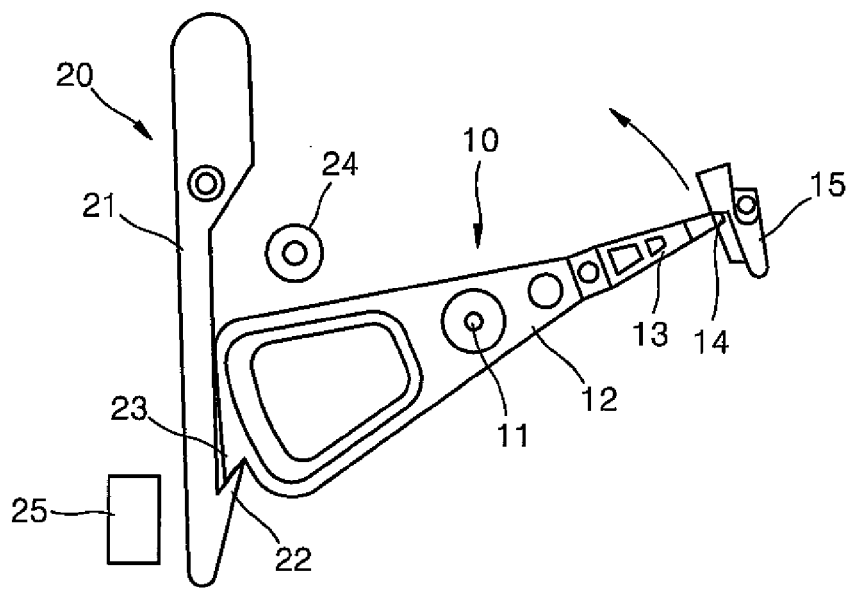
Figure 1C:
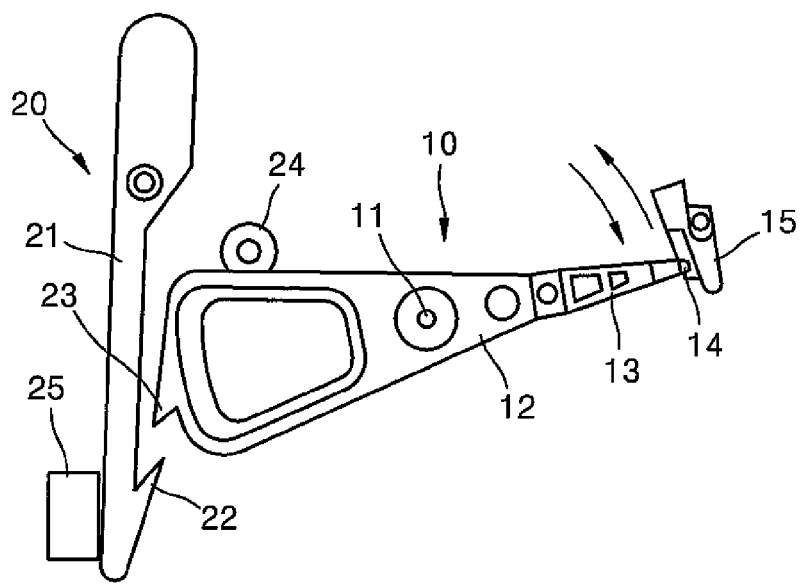
Figure 2A:
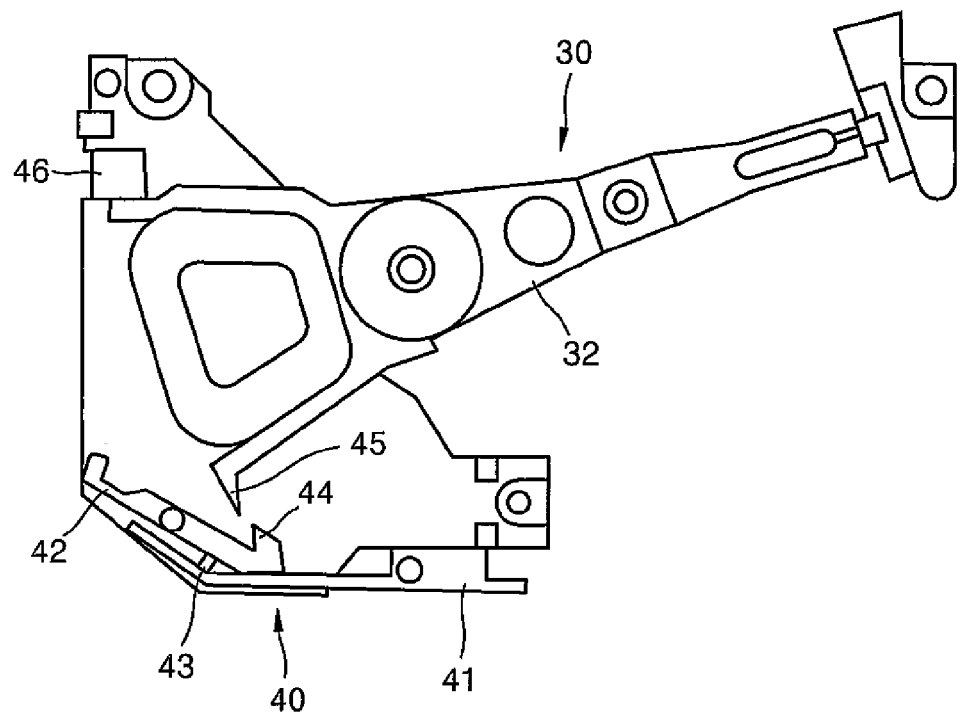
FIGS. 2A, 2B, and 2C are each a plan view of a conventional dual-lever inertial latch system of an HDD, and together illustrate the operation of the latch system.
Figure 2B:
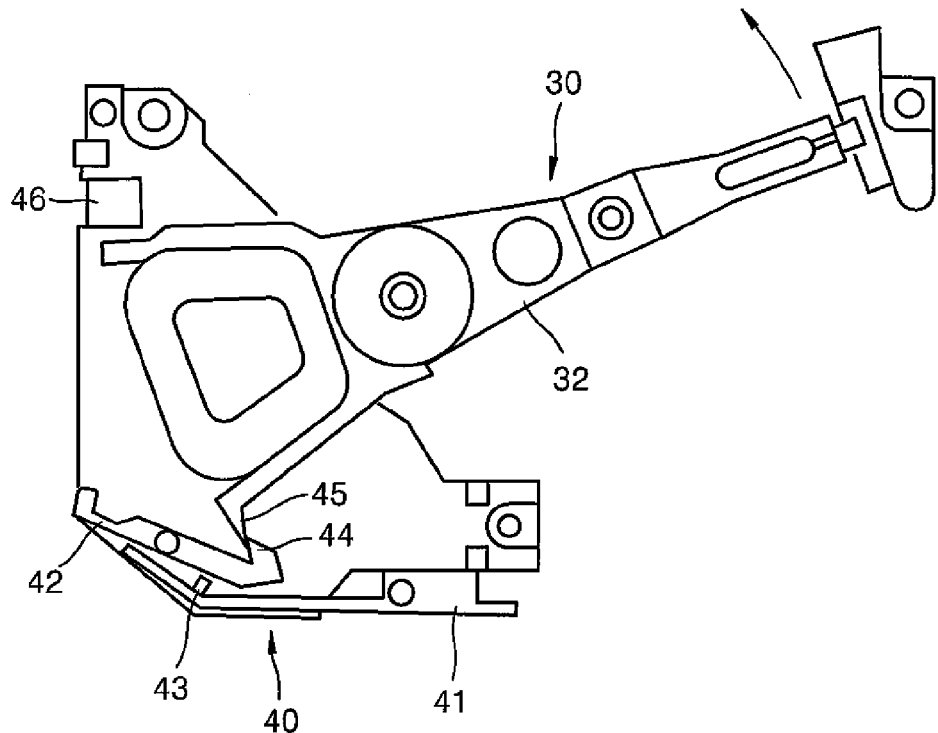
Figure 2C:
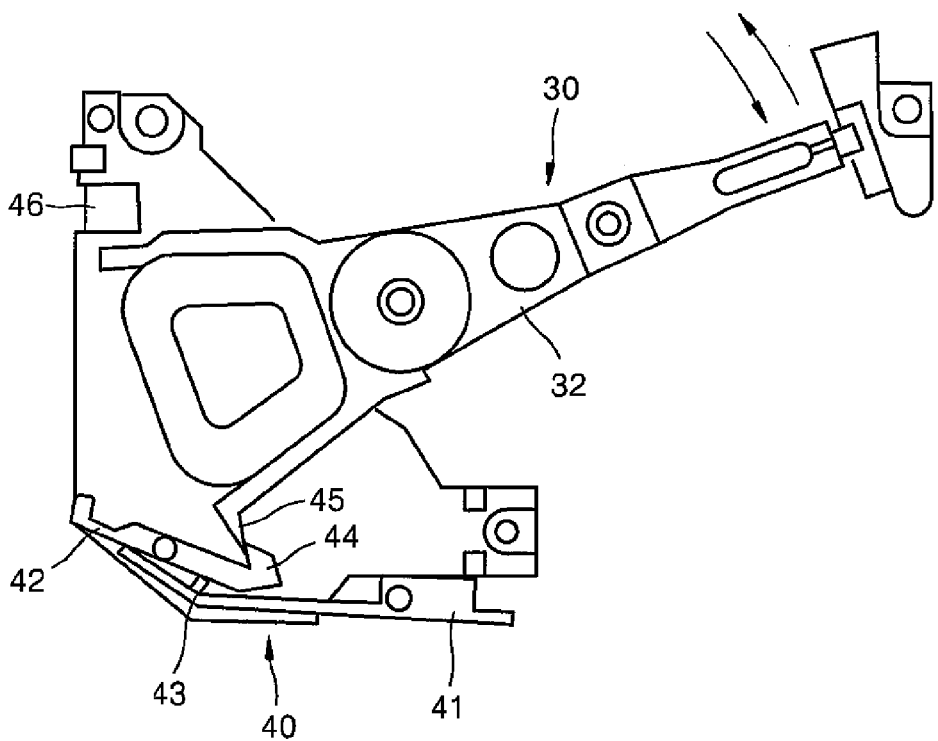
Figure 3:
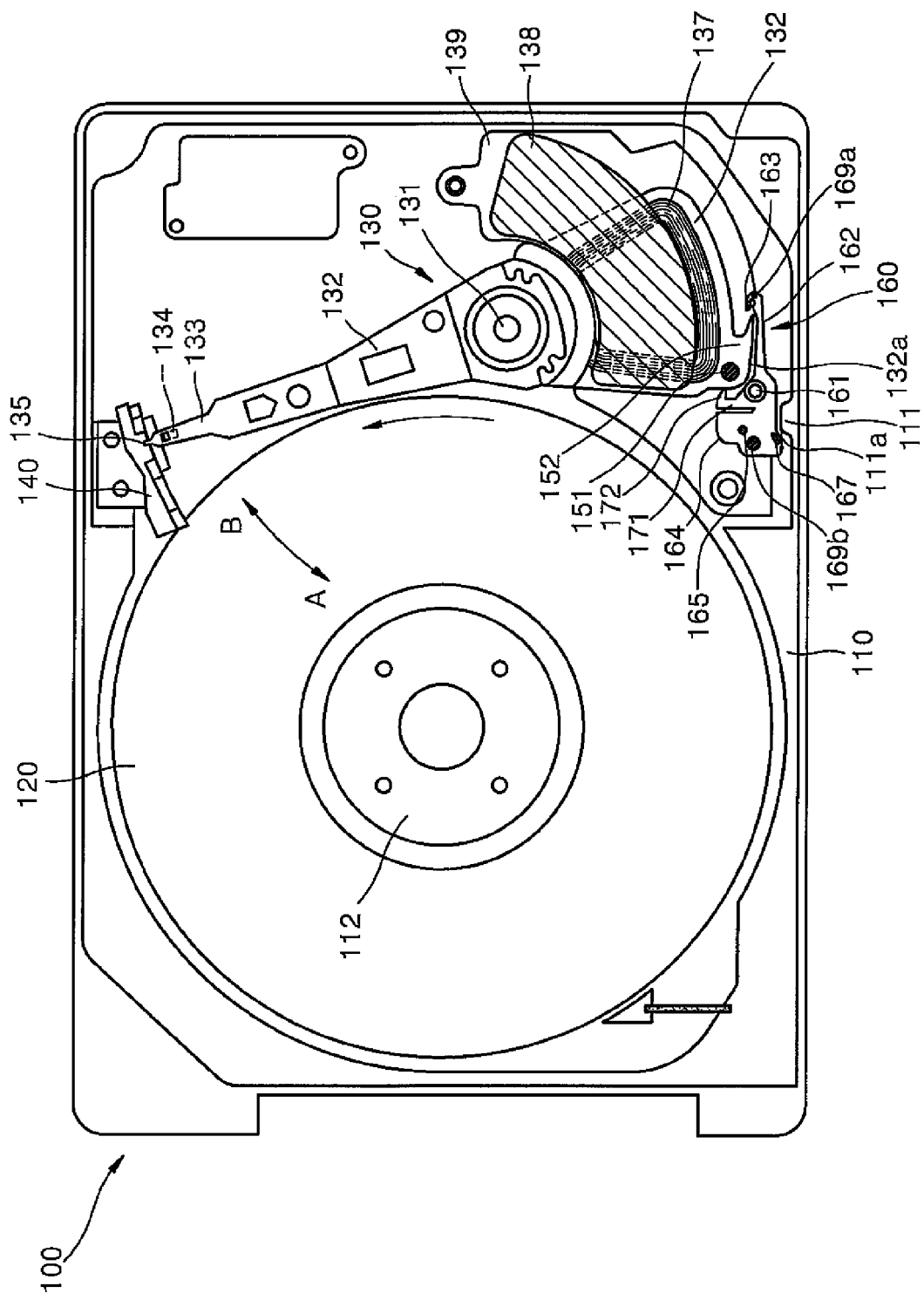
FIG. 3 is a plan view of an HDD including an actuator latch system according to the present invention.
Figure 4:
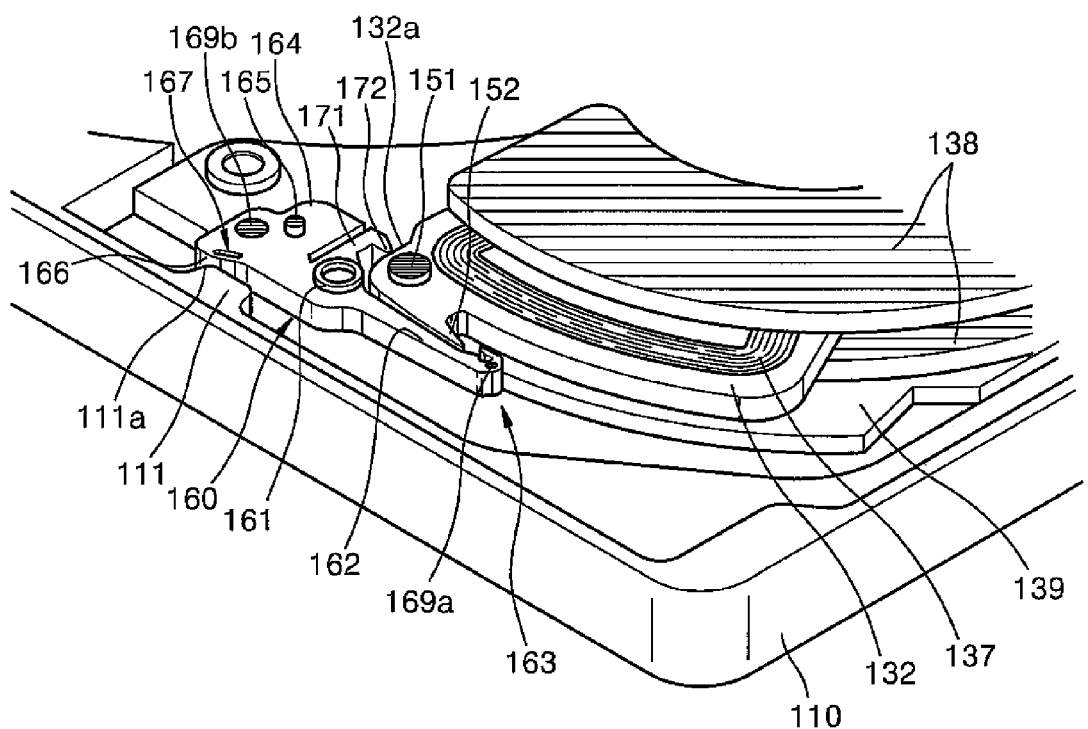
FIG. 4 is a perspective view of the actuator latch system of the HDD shown in FIG. 3.
Figure 5:
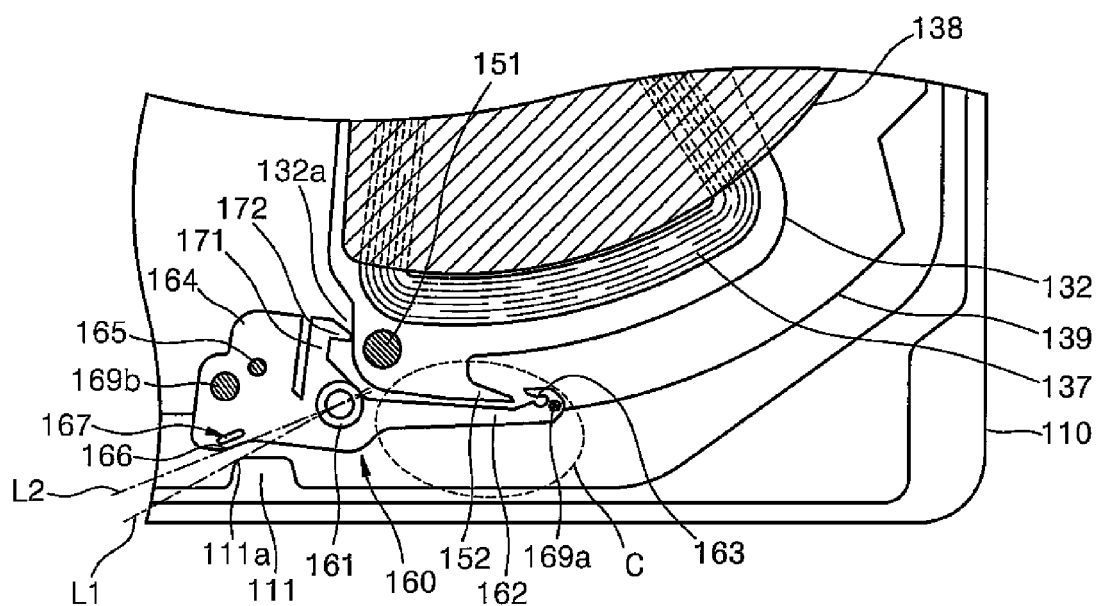
FIG. 5 is a plan view of the actuator latch system according to the present invention.
Figure 6:
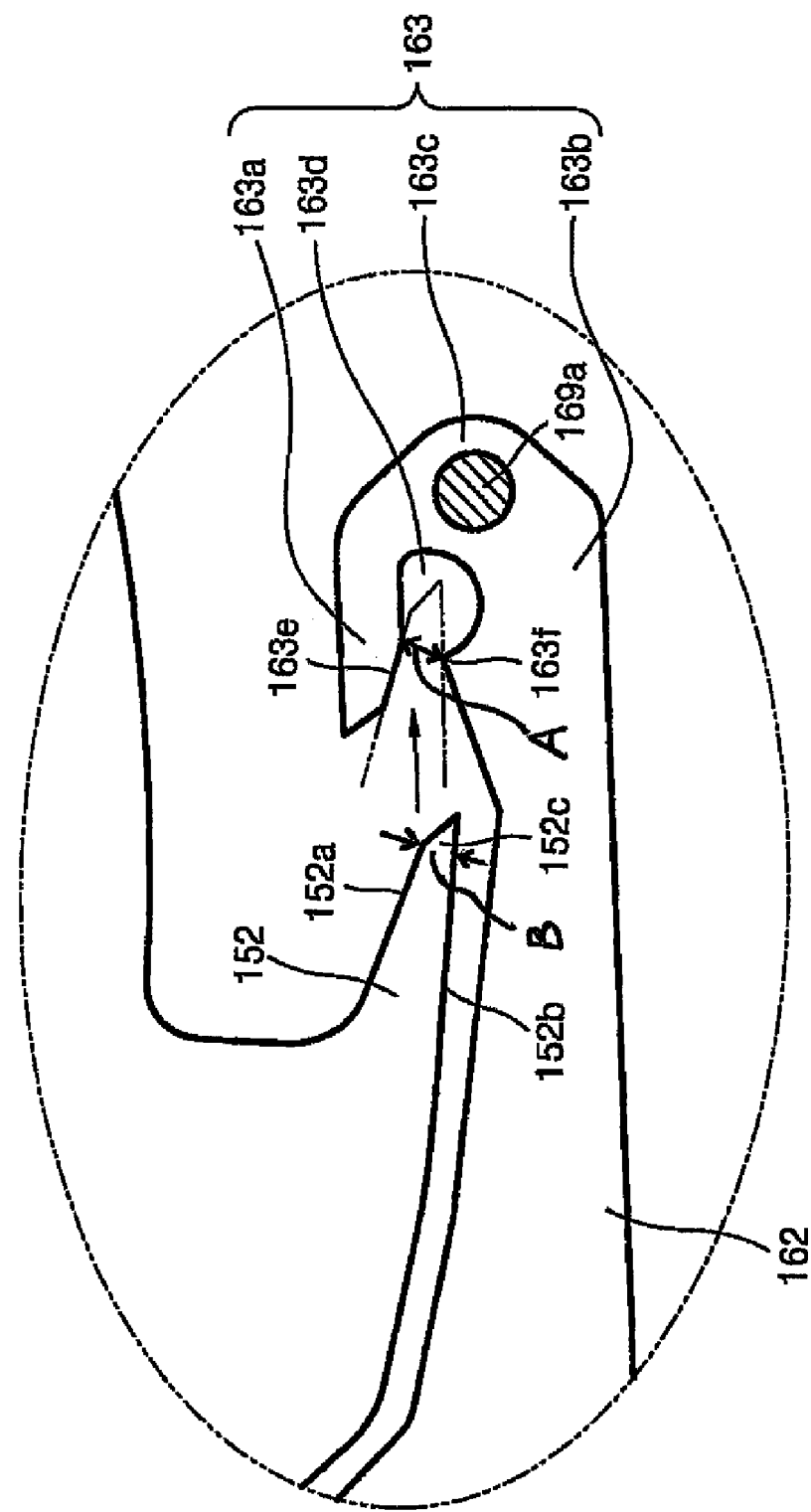
FIG. 6 is an enlarged view of portion C of FIG. 5 and illustrate in detail features of the latch system according to the present invention.

Referring first to FIGS. 3 through 5, the HDD 100 includes a base 110, a spindle motor 112 mounted to the base 110, a disk 120 mounted to the spindle motor 112 so as to be rotated by the spindle motor 112, a magnetic head, and an actuator 130 that moves the magnetic head over the disk 120 to facilitate the recording/reproducing data onto/from the disk 120. The actuator 130 includes a pivot 131 disposed on the base 110, a swing arm 132 supported by the pivot 131 so as to be rotatable, a head slider 134 that contains the magnetic head, a suspension assembly 133 disposed on a front end portion of the swing arm 132 and which supports the head slider 134, and a voice coil motor (VCM) that rotates the swing arm 132 about the central longitudinal axis of the pivot 131. The elasticity of the suspension assembly 133 biases the magnetic head towards a surface of the disk 120 during a read/write operation in which data is being recorded onto or read from the surface of the disk.

The VCM includes a VCM coil 137 disposed on a rear end portion of the swing arm 132, and a magnet or magnets 138 disposed above and/or below the VCM coil 137 so as to face the VCM coil 137. The magnet(s) 138 is/are attached to a yoke 139 that is, in turn, fixed to the base 110. The VCM is controlled by a servo control system that controls the supply of current to the VCM coil 137, and rotates the swing arm 132 in a direction according to Fleming's left-hand rule due to an interaction between the electric current flowing through the VCM coil 137 and the magnetic field formed by the magnets 138. In particular, when the HDD 100 is turned on and the disk 120 starts rotating, the VCM rotates the swing arm 132 counter-clockwise to move the magnetic head onto a recording surface of the disk 120. On the other hand, when the HDD 100 is turned off and the disk 120 stops rotating, the VCM rotates the swing arm 132 clockwise so that the magnetic head is moved off of the recording surface of the disk 120 and is parked. More specifically, when the disk 120 stops rotating, the swing arm 132 is rotated clockwise by the VCM, and an end-tab 135 of the suspension assembly 133 is slid up and onto the ramp 140 where it remains to thereby park the magnetic head.

The HDD 100 also includes an actuator latch system. The actuator latch system retains the actuator 130 when the magnetic head 140 is parked. That is, the actuator latch system prevents external shock or vibrations from rotating the swing arm 132 beyond certain limits when the HDD 100 is not in use, i.e., when the magnetic head is parked. In particular, the actuator latch system prevents the magnetic head from being moved into contact with the recording surface of the disk 120 which situation could otherwise result in the recording surface and/or the magnetic head being damaged.

The actuator latch system includes a member defining a notch 152 at a rear end portion of the swing arm 132, and a latch lever 160 rotatably supported on the base 110 by a pivot 161. The rear end portion of the swing arm 132 is generally formed of an injection-molded plastic such that the member defining the notch 152 is easily formed unitarily with the swing arm 132 during the injection molding process.

The latch lever 160 has a latch arm 162 at one side thereof, and a counterbalance 164 at the other side thereof. More specifically, the latch arm 162 and the counterbalance 164 are disposed on opposite sides of the pivot 161 from one another. The latch arm 162 has hook 163 at a front end portion thereof. The latch lever 160 is rotated clockwise or counter-clockwise due to inertia when a shock is applied to the HDD while the magnetic head is parked. As will be described in more detail later on, the hook 163 of the latch arm 162 engages the swing arm 132 within the notch 152 to prevent the swing arm 132 from rotating beyond a predetermined limit while the magnetic head is parked.

The latch system also has a stopper 111 positioned on the base 110 to block the counterbalance 164. More specifically, the stopper 111 collides with the counterbalance 164 of the latch lever 160 when the latch lever 160 rotates counter-clockwise due to inertia. Thus, the stopper 111 limits the rotation of the latch lever 160 in the counter-clockwise direction. In addition, a straight line L1 projected along the impact surface 111a of the stopper 111 which collides with the counterbalance 164, and a straight line L2 projected along the impact surface 166 of the counterbalance 164 which collides with the surface 111a of the stopper 111, respectively pass through the pivot 161 of the latch lever 160 (refer to FIG. 5). Accordingly, a minimal amount of friction is generated between the impact surface 166 of the counterbalance 164 and the impact surface 111a of the stopper 111 when the impact surfaces 166, 111a collide. Therefore, the surfaces 166, 111a will not abrade to any appreciable extent when the surfaces 166, 111a collide. Accordingly, the surfaces 166, 111a do not produce particles when the surfaces 166, 111a collide with each other. In addition, the counterbalance 164 may have a hole 167 extending therein in the direction of the thickness of the latch lever 160. The hole 167 helps the counterbalance 164 absorb shock when the counterbalance 164 collides with the stopper 111 and thus, prevents the latch lever 160 from being damaged and helps to minimize noise. The member that defines the notch 152 and the hook 163 will now be described in more detail with reference to FIG. 6.

The rear end portion of the swing arm 132 has first and second surfaces 152a and 152b which meet at a point of inflection where the notch 152 terminates. The first surface 152a delimits the notch 152. The hook 163 engages the first and second surfaces 152a and 152b when the swing arm 132 is rotated counter-clockwise due to inertia when the magnetic head is parked and a shock is applied to the actuator. To this end, the hook 163 is basically C-shaped as opposed to V-shaped. More specifically, the hook 163 includes a first portion 163a, a second portion 163b that extends generally parallel to the first portion 163a, and a third portion 163c extending between and connecting the first portion 163a and the second portion 163b. In addition, inner surfaces of the first, second, and third portions 163a, 163b, and 163c of the hook 163 delimit a slot 163d that faces in a direction towards the notch 152. The portion of the swing arm 132 where the surfaces 152a and 152b meet at a point of inflection, i.e., a corner 152c or pointed portion of the swing arm 132, is inserted into the slot 163d when the swing arm 132 is rotating counter-clockwise while the magnetic head is parked. At this time, the first portion 163a of the hook 163 contacts the first surface 152a, the second portion 163b of the hook 163 contacts the second surface 152b. As a result, the corner 152c is pinched between the first and second portions 163a and 163b of the hook 163, and the first and second portions 163a and 163b of the hook 163 are elastically deformed to some degree to absorb the shock transferred from the swing arm 132 to the latch lever 160. Accordingly, the swing arm 152 is prevented from rotating in the opposite direction, i.e., is prevented from rebounding from the latch lever 160.

In addition, the first portion 163a of the hook 163 may have an inclined surface 163e that contacts the first surface 152a of the swing arm 132 (the surface delimiting the notch 152). The inclined surface 163e extends obliquely with respect to the direction in which the latch arm 162 extends. The first surface 152a of the swing arm 132 has a slope corresponding to that of the inclined surface 163e of the first portion 163a of the hook 163 when the corner 152c at the rear end of the swing arm 132 is received in the slot 163d of the hook 163. Accordingly, the first surface 152a of the rear end portion of the swing arm 132 and the inclined surface 163e of the hook 163 will contact each other over a wide area when the hook 163 engages the corner 152c of the swing arm 132. Thus, the shock will be absorbed effectively by the hook 163.

Also, the second portion 163b of the hook 163 may have a protrusion 163f protruding toward the inclined surface 163e of the first portion 163a of the hook 163. The protrusion 163f is triangular so as to make what is substantially point contact with the second surface 152b of the rear end portion of the swing arm 132. Accordingly, the corner 152c of the swing arm 132 can easily escape from the slot 163d of the hook 163 when the swing arm 132 rotates clockwise.

Moreover, the width of an inlet of the slot 163d, that is, the distance between (the inclined surface 163e of) the first portion 163a of the hook and (the protrusion 163f of the) the second portion 163b of the hook 163, and the elasticity of the first portion 163a of the hook 163, may be designed such that the point of inflection does not contact any of the surfaces that delimit the slot 163d of the hook 163. That is, the width A of the inlet of the slot is less than a width B of the corner 152c of the swing arm 132 as measured between said first and second surfaces 152a and 152b of the rear end of the swing arm. This prevents the maximum amount of shock from being transferred directly from the swing arm 132 to the hook 163.

Referring back to FIGS. 3 through 5, the rotation of the swing arm 132 in the clockwise direction due to inertia, when a shock is applied to the HDD while the magnetic head is parked, is restricted by the counterbalance 164. More specifically, the counterbalance 164 collides with a side of the rear end of the swing arm 132 as the swing arm rotates clockwise to prevent the swing arm 132 from rotating further in the clockwise direction. The counterbalance 164 may include a buffering arm 171 for buffering the shock generated when the counterbalance 164 and the swing arm 132 collide. To this end, the buffering arm 171 is preferably formed of an elastic material, for example, a plastic material such as polyimide. Also, the buffering arm 171 may have a protrusion 172 that projects toward the side of the rear end of the swing arm 132. The protrusion 172 reduces the area of contact between the buffering arm 171 and the swing arm 132 in order to minimize the amount of particles that are produced when the buffering arm 171 and the swing arm 132 collide.

Furthermore, the latch system may also have a first core 151 and a second core 165 disposed, respectively, in the swing arm 132 and the latch lever 160. The first core 151 is disposed in a corner of the rear end portion of the swing arm 132. The first core 151 may be a magnetic body, for example, a steel body, so that a magnetic force of attraction is generated between the first core 151 and the magnet(s) 138. Therefore, the first core 151 applies torque to the swing arm 132 in the clockwise direction. The torque prevents the actuator 130 from being moved by weak shocks and vibrations.

The second core 165 may be also formed of a magnetic body, for example, a steel body, so that a magnetic force of attraction is generated between the second core 165 and the magnet(s) 138. Therefore, the second core 165 applies a torque to the latch lever 160 in the clockwise direction. Therefore, the locked state of the actuator 130 can be maintained. Preferably, the size of the first core 151 is larger than that of the second core 165 so that the torque applied to the swing arm 132 is greater than that applied to the latch lever 160.

The latch system may also include a first weight 169a and a second weight 169b installed, respectively, on the latch arm 162 and the counterbalance 164 of the latch lever 160. More specifically, the first weight 169a is installed on a front end portion of the latch arm 162, that is, on the hook 163, and the second weight 169b is installed on a rear end portion of the counterbalance 164. The balance of the latch lever 160, that is the difference in weight on opposite sides of the pivot 161, can be set by selecting weights 169a and 169b of certain masses so that the latch lever 160 can have a desired inertia.

The operation of the actuator latch system will now be described with reference to FIGS. 7 and 8.

Figure 7:
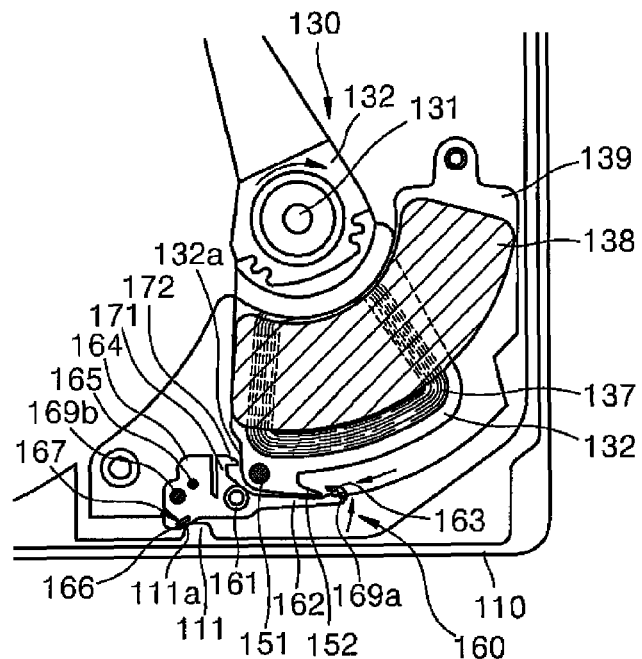
FIG. 7 is a plan view of the actuator latch system according to the present invention and illustrates the locking of an actuator of the HDD by the latch system.

Referring first to FIG. 7, the swing arm 132 is rotated by the VCM clockwise about the axis of the pivot 131 to park the magnetic head on the ramp 140 when the HDD 100 is turned off (refer to FIG. 3). At this time, the side of the rear end of the swing arm 132 contacts the protrusion 172 projecting from the buffering arm 171 of the latch lever 160, and thereby rotates the latch lever 160 counter-clockwise about the axis of the pivot 161. Then the counterbalance 164 of the latch lever 160 contacts the stopper 111 such that the rotation of the latch lever 160 in the counter-clockwise direction is arrested.

The VCM is turned off when the magnetic head is parked on the ramp 140. At this time, the swing arm 132 is maintained in position by the torque applied to the swing arm 132 in the clockwise direction by the first core 151 and the magnet (s) 138. In addition, as described above, the torque that is applied to the swing arm 132 is larger than that applied to the latch lever 160 by the second core 161 and the magnet(s) 38. Therefore, the swing arm 132 remains stably locked in position.

Meanwhile, the swing arm 132 can be rotated counter-clockwise due to inertia in the state in which the magnetic head is parked, when a shock applied to the HDD 100 generates torque that is greater than the torque applied to the swing arm 132 by the first core 151 and the magnet 138. Accordingly, the swing arm 132 is hooked by the hook 163 of the latch lever 160. Therefore, the rotation of the swing arm 132 in the counter-clockwise direction is arrested. More specifically, the pointed rear end portion 162c of the swing arm 132 is inserted into the slot 163d of the hook 163. Thus, the shock of the collision between the swing arm 132 and the hook 163 is absorbed by the hook 163. Therefore, the resulting tendency of the swing arm 132 to rotate in the opposite direction, that is, in the clockwise direction, is reduced. In addition, the only part of the latch arm 162 that contacts the rear end portion of the swing arm 132 is the hook 163 because the stopper 111 prevents the latch lever 160 from rotating beyond a predetermined limit in the counter-clockwise direction.

On the other hand, the shock applied to the HDD 100 can generate torque that acts on the swing arm 132 and the latch lever 160 in the clockwise direction. In this case, the side surface 132a of the rear end of the swing arm 132 and the buffering arm 171 of the latch lever 160 collide. Thus, the swing arm 132 and the buffering arm 171 may rebound from one another so as to both rotate counter-clockwise. However, at this time, the swing arm 132 and the latch lever 160 do not rotate counter-clockwise with a great deal of energy because the buffering arm 171 of the latch lever 160 absorbs the shock of their collision to some degree. Regardless, the rotation of the latch lever 160 in the counter-clockwise direction is arrested by the stopper 111. Also, the rotation of the swing arm 132 in the counter-clockwise direction is arrested by the hook 163 of the latch lever 160.

Figure 8:
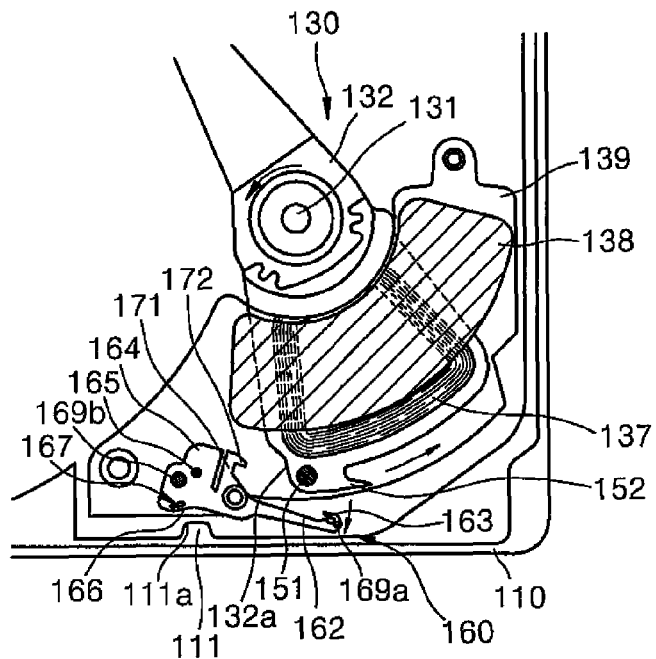
FIG. 8 is a plan view of the actuator latch system, similar to that of FIG. 7, but illustrates a releasing of the actuator by the latch system according to the present invention.

Next, referring to FIG. 8, current is supplied in one direction to the VCM coil 137 to operate the HDD 100. The interaction between the current and the magnetic field generated by the magnet(s) 138 creates an electromotive force on the swing arm 132 which is greater than the torque applied to the swing arm 132 due to the magnetic force of attraction between first core 151 and the magnet(s) 138. Thus, the swing arm 132 rotates counter-clockwise. At the same time, the latch lever 160 is rotated clockwise by the torque created by the magnetic force of attraction between the second core 165 and the magnet 138. Thus, the swing arm 132 is not engaged by main hook portions 163a and 163b and rebound hook portion 163c of the latch lever 160.

According to the actuator latch system of the present invention as described above, the hook of the latch lever absorbs shock transferred from the swing arm. In addition, the hook may pinch the pointed rear end portion of the swing arm. Therefore, the latch lever and the swing arm will not rebound from one another. Accordingly, the swing arm will not be released prematurely by the actuator latch system. Moreover, the design of the hook allows the pointed rear end portion of the swing arm to escape therefrom when the swing arm is rotated by the VCM to initiate a read/write operation.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. In a hard disk drive (HDD) having a base, a swing arm supported on the base so as to be rotatable about an axis of rotation, and a magnetic head supported by the swing arm, an actuator latch system comprising:

a member constituting an integral part of a rear end of the swing arm and which member has a corner portion where first and second surfaces of said member meet at a point of inflection, the first surface delimiting a notch at the rear end of the swing arm; and a latch lever disposed adjacent the rear end of the swing arm when the swing arm is in a position at which the magnetic head is parked, the latch lever being mounted to the base so as to be rotatable about an axis of rotation, and the latch lever having a hook at one side thereof, the hook being C-shaped so as to define a slot therein, an inlet of the slot and the point of inflection facing in directions toward each other, whereby the corner portion enters the slot and the hook engages the first and second surfaces of said member when the HDD experiences a shock that causes the swing arm to rotate in one direction while the magnetic head is parked, so that the hook absorbs the shock transmitted by the swing arm, wherein the latch lever includes a latch arm extending at one side of the axis of rotation of the latch lever, and the hook has a first portion, a second portion extending from the latch arm, and a third portion extending between and connecting the first and second portions, inner surfaces of the first, second, and third portions delimit said slot, and the inlet of the slot has a width that is less than a width of the corner portion of the member constituting an integral part of a rear end of the swing arm as measured between said first and second surfaces, whereby the inner surface of the first portion of the hook contacts the first surface of said member constituting an integral part of a rear end of the swing arm, and the inner surface of the second portion of the hook contacts the second surface of said member when the HDD experiences the shock that causes the swing arm to rotate in said one direction while the magnetic head is parked, and wherein the second portion of the hook has a protrusion that contacts the second surface of said member constituting an integral part of a rear end of the swing arm when the hook is engaged with the first and second surfaces of said member.

2. The actuator latch system in an HDD of claim 1, wherein the inner surface of the first portion of the hook is an inclined surface that extends obliquely with respect to a direction in which the latch arm extends.

3. The actuator latch system in an HDD of claim 2, wherein the first surface of said member constituting an integral part of a rear end of the swing arm has a slope that is substantially the same as that of the inner surface of said first portion of the hook when the hook is engaged with the first and second surfaces of said member.

4. The actuator latch system in an HDD of claim 1, wherein the protrusion is triangular.

5. In a hard disk drive (HDD) having a base, a swing arm supported on the base so as to be rotatable about an axis of rotation, and a magnetic head supported by the swing arm, an actuator latch system comprising:

a member constituting an integral part of a rear end of the swing arm and which member has a corner portion where first and second surfaces of said member meet at a point of inflection, the first surface delimiting a notch at the rear end of the swing arm; and a latch lever disposed adjacent the rear end of the swing arm when the swing arm is in a position at which the magnetic head is parked, the latch lever being mounted to the base so as to be rotatable about an axis of rotation, and the latch lever having a hook at one side thereof, the hook defining a slot, an inlet of the slot and the point of inflection facing in directions toward each other, and the inlet of the slot having a width that is less than a width of the corner portion as measured between said first and second surfaces, whereby the corner portion enters the slot and the hook engages the first and second surfaces of said member when the HDD experiences a shock that causes the swing arm to rotate in one direction while the magnetic head is parked, so that the hook absorbs the shock transmitted by the swing arm, wherein the latch lever includes a latch arm extending at one side of the axis of rotation of the latch lever, and the hook has a first portion, a second portion extending from the latch arm, and a third portion extending between and connecting the first and second portions, and inner surfaces of the first, second, and third portions delimit said slot, whereby the inner surface of the first portion contacts the first surface of the rear end of the swing arm, and the inner surface of the second portion contacts the second surface of the rear end of the swing arm when the HDD experiences the shock that causes the swing arm to rotate in said one direction while the magnetic head is parked, and wherein the second portion of the hook has a protrusion that contacts the second surface of the rear end of the swing arm when the hook is engaged with the first and second surfaces of the rear end of the swing arm.

6. The actuator latch system in an HDD of claim 5, wherein the inner surface of the first portion of the hook is an inclined surface that extends obliquely with respect to a direction in which the latch arm extends.

7. The actuator latch system in an HDD of claim 6, wherein the first surface of the rear end of the swing arm has a slope that is substantially the same as that of the inner surface of said first portion of the hook when the hook is engaged with the first and second surfaces of the rear end of the swing arm.

8. The actuator latch system in an HDD of claim 5, wherein the protrusion is triangular.

* * * * *